United States Patent [19]

Horiike et al.

[11] Patent Number: 4,903,790
[45] Date of Patent: Feb. 27, 1990

[54] MOTORCYCLE

[75] Inventors: Satoru Horiike, Tokyo; Yasuhiko Nakano, Saitama; Shigetaro Okano, Saitama; Shigeru Kimura, Saitama; Toshiteru Yamamoto, Saitama; Masanobu Matsuzaki; Eiji Hamano, both of Tokyo; Mikio Kubo, Saitama, all of Japan

[73] Assignee: Honda Giken Kogyo Kabushiki Kaisha, Tokyo, Japan

[21] Appl. No.: 167,888

[22] Filed: Mar. 14, 1988

[30] Foreign Application Priority Data

Mar. 13, 1987 [JP] Japan ................. 62-59233

[51] Int. Cl.⁴ ................. B62D 9/02; B62D 37/04
[52] U.S. Cl. ................. 180/219; 280/112.2; 280/204; 280/220; 280/282; 296/185
[58] Field of Search ............ 180/219, 210, 213, 215, 180/209, 903; 280/204, 220, 210, 282, 112.2; 296/185, 901

[56] References Cited

U.S. PATENT DOCUMENTS

| 2,887,322 | 5/1959 | De Monge | 280/112 A X |
| 3,794,351 | 2/1974 | Cudmore | 280/204 |
| 3,938,609 | 2/1976 | Kensaku et al. | 180/210 |
| 3,971,452 | 7/1976 | Morelli | 180/219 X |
| 4,065,144 | 12/1977 | Winchell | 280/112 A X |
| 4,290,228 | 9/1981 | Goldfarb et al. | 180/219 X |
| 4,351,410 | 9/1982 | Townsend | 280/112 A X |

FOREIGN PATENT DOCUMENTS

| 282333 | 9/1988 | European Pat. Off. | 180/219 |
| 2583704 | 12/1986 | France | 180/219 |

Primary Examiner—Mitchell J. Hill
Attorney, Agent, or Firm—Birch, Stewart, Kolasch & Birch

[57] ABSTRACT

A motorcycle exhibiting improved cornering clearance has its front and rear wheels mounted to a fixed frame portion via front and rear suspensions. A moveable frame portion including the motorcycle seat is moveably mounted to the fixed frame portion and moves under control of the rider further inside a corner during cornering in order to shift the effective center of gravity of the motorcycle further inside the corner and thus further increase the lean angle of the entire motorcycle. Movement is provided via a pivot, slidable shaft, or a pair of parallel linkages. The moveable frame portion may include only the motorcycle seat or may include the tank, seat, and entire motorcycle fairing.

17 Claims, 3 Drawing Sheets

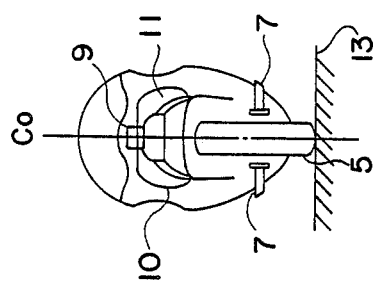
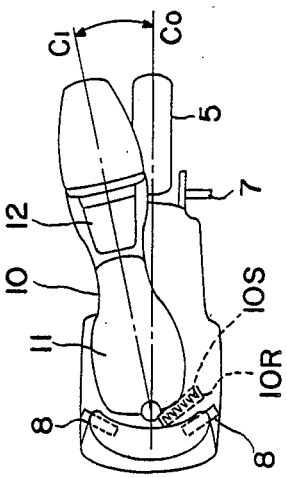
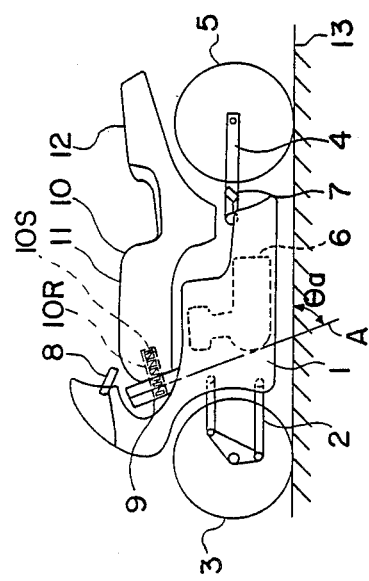
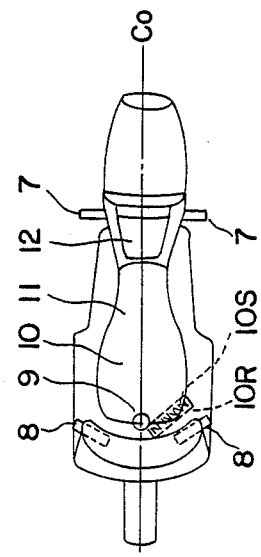
FIG. 1
FIG. 2
FIG. 3
FIG. 4

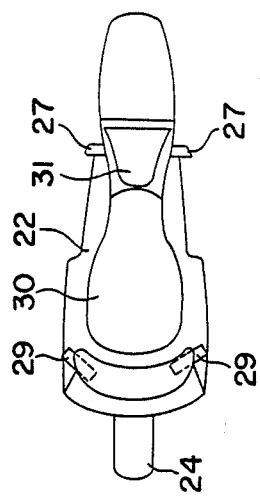
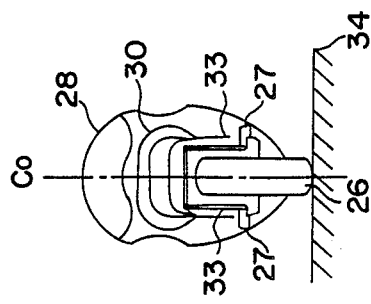
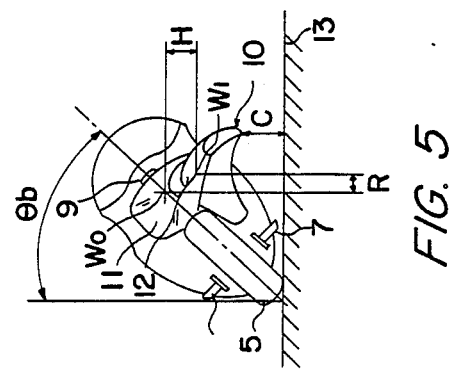
FIG. 7
FIG. 8
FIG. 5
FIG. 6

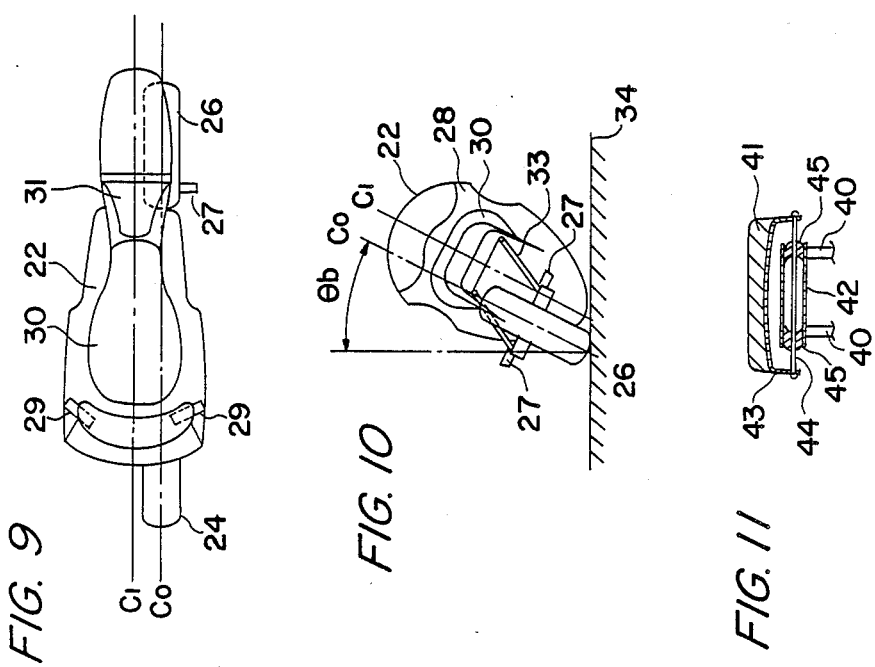

MOTORCYCLE

FIELD OF THE INVENTION

The present invention relates to a motorcycle frame arrangement which improves the motorcycle's cornering speed. More particularly, the present invention relates to a motorcycle employing a frame which allows a portion of the motorcycle to be shifted towards the inside of the corner with respect to the motorcycle's normal center axis in order to shift the center of gravity of at least a portion of the motorcycle toward the inside of the motorcycle when leaned into a corner and lower to the ground to thereby improve cornering speeds.

BACKGROUND OF THE INVENTION

During cornering, a motorcycle is banked or leaned toward the inside of the corner at an angle sufficient to enable the weight of the motorcycle to offset the centrifugal force pulling the motorcycle outside toward the outside of the corner. These motions act upon the center of gravity of the whole motorcycle which is acted upon by the offsetting centrifugal force forcing the motorcycle outwardly from the corner and the force of gravity attracting the motorcycle inside due to the inward lean angle of the motorcycle.

For increased cornering speeds, the bank or lean angle of the motorcycle must become larger in order to balance the centrifugal force and the force of gravity. However, the lean angle is limited by several factors related to the construction of the motorcycle. The motorcycle may not be leaned to an angle greater than that which provides ground clearance to prevent portions of the motorcycle including the engine, steps or foot pegs, etc. from scraping the ground. Thus, the limitation of the width of the motorcycle limits the bank angle which may be employed. This bank angle is often limited by engine width. While the engine may be raised in the frame in order to obtain a higher bank angle, raising the motorcycle engine in the frame raises the center of gravity and impairs transient cornering performance due to the consequent higher inertial forces which must be supplied to the motorcycle to initiate a change in attitude.

It is therefore an object of the present invention to provide a motorcycle which can corner at higher rates of speed without encountering the bank angle limitations mentioned above.

It is another object of the present invention to provide a motorcycle with a fixed frame member and a moveable portion of the frame.

It is still another object of the present invention to provide a motorcycle structure which enables a shifting of at least a portion of the motorcycle structure to shift the center of gravity of at least a portion of the motorcycle structure toward the inside of the center of gravity of a fixed portions of the motorcycle to thereby shift the effective total center gravity of the motorcycle to the inside of the corner.

These and other objects of the present invention are achieved by the unique motorcycle construction according to the teachings of the present application.

SUMMARY OF THE INVENTION

A motorcycle formed according to the teachings of the present invention includes a fixed frame portion, front and rear wheels suspended from the fixed frame portion, and a moveable frame portion. A lean angle is exhibited by the fixed frame portion with respect to vertical. The moveable frame portion may be shifted with respect to the fixed frame portion to allow the operator to shift the moveable frame portion further inside the corner to thereby shift the effective center of gravity of the motorcycle and thus increase the lean angle of the entire motorcycle. The moveable frame portion incorporates a seat for supporting the operator who is therefore also shifted inwardly. As a result of the shifting of the effective center of gravity inwardly, for a predetermined lean angle, the motorcycle according to the teachings of the present invention may be cornered at increased speeds for a given lean or bank angle not heretofore seen in the prior art.

BRIEF DESCRIPTION OF THE DRAWINGS

The present invention will become more fully understood with reference to the attached drawing figures briefly described below when considered with the specification of the present application which describes several preferred embodiments of the present invention.

FIG. 1 illustrates a schematic side view of a first embodiment of the motorcycle according to the teachings of the present invention;

FIG. 2 is a schematic top view of the first embodiment of the motorcycle of FIG. 1;

FIG. 3 is a schematic rear view of the preferred embodiment in FIG. 1;

FIG. 4 is a schematic top view of the preferred embodiment of FIG. 1 illustrating the pivoting of the moveable frame body portion 10 with respect to the frame body;

FIG. 5 is a schematic rear view of the preferred embodiment of FIG. 1 showing the moveable frame body portion 10 swung inwardly of a corner with respect to the remainder of the motorcycle including the frame body 1 thereof;

FIG. 6 is a schematic side view of a second embodiment of the motorcycle of the present invention;

FIG. 7 is a schematic top view of the second preferred embodiment illustrated in FIG. 6;

FIG. 8 is a schematic rear view of the second preferred embodiment of FIG. 6;

FIG. 9 is a schematic top view of the second embodiment of FIG. 6 illustrating the shifting of the moveable frame body portion 22 with respect to the remainder of the motorcycle;

FIG. 10 is a schematic rear view of the second preferred embodiment showing its configuration during cornering;

FIG. 11 illustrates a third preferred embodiment of the present invention and is a sectional rear view of a portion of the motorcycle through the motorcycle seat;

FIG. 12 is a schematic side view of a fourth preferred embodiment of the present invention; and FIG. 13 is a partial section of the fourth preferred embodiment illustrating the details of the hinge 1C of the fourth preferred embodiment.

DETAILED DESCRIPTION OF THE PREFERRED EMBODIMENTS

FIG. 1 to FIG. 5 illustrate a first preferred embodiment of the present invention. A motorcycle is provided with a front wheel 3 mounted on a front swing arm 2 at a front portion of a frame body 1 and a rear wheel 5 mounted on a rear swing arm 4 at a rear portion of the frame body 1. A power unit 6, in the preferred embodiment an internal combustion engine, is mounted in the center portion of the frame body 1 and can drive the rear wheel 5 by means of a chain or other driving member (not shown).

A pair of steps or foot pegs 7,7 are fixed respectively to the right and left side portions of the frame body 1 and a handlebar 8 is provided at the upper front portion of the frame body for providing a steering input to the front wheel 3. A moveable frame body portion 10 is swingingly mounted on a head pipe 9 of the front portion of the frame body 1 to pivot thereabout. The moveable frame body portion 10 can be swung to both sides of the frame body 1 about a swing center axis A of the head pipe 9 under control of a rider. The moveable frame portion 10 is formed as a single upper frame portion unit including a fuel tank 11 and a seat 12. If necessary, a return apparatus 10R (schematically illustrated in FIGS. 1 and 2) including one or more springs 10S (also schematically illustrated in these figures) may be provided in order to facilitate the return of the moveable frame body portion 10 back from a pivoted center line $C_1$ to an original center line $C_0$ as illustrated in FIG. 4.

FIGS. 1 and 3 illustrate the motorcycle formed according to the teachings of the present application supported on a land surface 13. The function of the present preferred embodiment may therefore now be described. FIGS. 2 and 3 illustrate the condition of the motorcycle when traveling in a straight line, a condition which is the same as that of a conventional motorcycle having a single rigid frame. When the motorcycle of the preferred embodiment of FIGS. 1-5 executes a right-handed corner, the frame body 1 is banked or inclined to a reasonable banking or lean angle $\theta_b$ as illustrated in FIGS. 4 and 5. This lean angle $\theta_b$ is limited to a maximum value determined by the adhesion characteristics of the tires and the cornering clearance provided by the construction of the frame, the location of the engine in the frame, and the position of the steps or foot pegs 7,7. In the past, in conventional motorcycles, this maximum lean angle limited the cornering speed of the motorcycle as larger lean angles are necessary for increased cornering speeds to offset the larger centrifugal force created by those increased speeds.

According to the teachings of the present invention as illustrated in the present preferred embodiment, the moveable frame body 10 may be pivoted from the normal center line position $C_0$ as illustrated in FIG. 4 to the inwardly inclined center line position $C_1$ by pivoting the moveable frame body 10 about the twisting center of the head pipe 9 by inward forces provided by the operator to the moveable frame body 10 relative to the steps or foot pegs 7,7 and the handlebar 8. This pivoting of the moveable frame body 10 toward the inside of the corner increases the effective lean angle of the moveable frame body 10 to an angle greater than the reasonable lean angle $\theta_b$ of the remainder of the motorcycle to shift the center of gravity $W_0$ of the moveable frame body 10 when in its neutral position to an offset center of gravity $W_1$ toward the inside of the corner. As shown in FIG. 5, this offset of the center of gravity of the moveable frame body portion 10 from position $W_0$ to position $W_1$ toward the inside of the corner increases the effective lean angle and thus maximum cornering speed of the entirety of the motorcycle. The offset of the center of gravity to point $W_1$, depending on rider input may vary the shifted length R so that the cornering speed can be increased to the degree necessary to balance the centrifugal force seeking to pull the motorcycle upright. In the present preferred embodiment, the axis A of the head pipe 9 is inclined rearwardly at an angle $\theta_a$ with respect to the land surface 13 as shown in FIG. 1. When the moveable frame body portion 10 is pivoted around the head pipe 9 in a circular movement as illustrated in FIG. 5, the center of gravity is shifted inside the reasonable bank or lean angle $\theta_b$ by an amount R and is also lowered in height by an amount H determined by the amount of pivoting of the moveable frame body portion 10 from position $C_0$ to position $C_1$, angle $\alpha$ as illustrated in FIG. 4. By lowering the center of gravity to a desired degree, maximum cornering speed may be further improved according to the teachings of the present invention as shown in FIG 5. The adjustment of the angle $\theta_a$ between the axis A of the head pipe 9 and the land surface 13 varies the degree of lowering of the center of gravity H in relationship to the degree of inset of the center of gravity R. The angle $\theta_a$ between the axis A of the head pipe 9 and the land surface may be set to vertical so that the amount of lowering H is relatively less than the amount of inset R when compared to the angle $\theta_a$ illustrated in FIGS. 1-5. It is also possible to incline the axis A of the head pipe 9 forwardly to increase the clearance C between the moveable frame body portion 10 and the land surface 13 during pivoting of the moveable frame body portion 10. Thus, the clearance between the moveable frame body portion 10 of the motorcycle and the land surface may be varied by adjustment of the angle A to provide a desired value for the clearance C. If the clearance height is determined to be low, the head pipe axis A should be designed to incline forwardly to restore a reasonable clearance. Alternatively, if the clearance height C is higher than desired, the head pipe axis may be designed to incline rearwardly to lower the center of gravity such as illustrated in the present preferred embodiment.

A second preferred embodiment of the present invention will now be described with reference to FIGS. 6-10. In this second preferred embodiment, a moveable frame body portion 22 may be shifted in both side directions by means of a linkage mechanism which interconnects a frame 21 and the moveable frame body portion 22 of a frame body 20. A power unit 6 (schematically illustrated in FIG. 6) is mounted in the center of the frame 21 in a construction otherwise similar to that illustrated in the first embodiment. As in the first embodiment, both a front wheel 24 and a rear wheel 26 are respectively suspended on a front swing arm 23 and a rear swing arm 25 which are attached to the frame 21. A pair of steps or foot pegs 27,27 are mounted to each of the right and left sides of the rear portion of the frame body 20. The moveable frame body portion 22 surrounds the frame 21 and is formed as a single unit including a fairing 28 covering the frame body front and side portions, a handle bar 29 mounted at the upper front portion of the moveable frame body portion 22, a fuel tank 30 and a seat 31 and is connected to the frame 21 by means of duplicate parallel links 32,33 provided respectively at a front portion and a rear portion of the frame 21. In FIGS. 6, 8 and 10, the land surface is designated as element 34.

The preferred embodiment of FIGS. 6-10 is illustrated in a straight running condition in FIGS. 7 and 8. The frame body 20 is positioned vertically with respect to the land surface 34 and the moveable frame body portion 22 is in line with the center line $C_0$ of the frame body. When this second preferred embodiment is cornering to the right as illustrated in FIGS. 9 and 10, the operator moves the moveable frame body portion 22 by applying a relative force between the seat 31 and the pair of steps or foot pegs 27,27 and handle bar 29 to shift the moveable frame body portion 22 to the right through movement of the parallel links 32 and 33. The center line $C_0$ of the moveable frame body portion 22 therefore shifts to the shifted center line $C_1$ as illustrated in FIGS. 9 and 10 so that the center of gravity of the moveable frame body portion shifts to an inward and lower position as best illustrated in FIG. 10. By shifting the center of gravity of the moveable frame body portion 22 inwardly and by lowering the center of gravity of this portion as illustrated in FIG. 10, a substantial increase of the effective bank or lean angle may be created thereby allowing the motorcycle of this preferred embodiment to corner at a substantially increased cornering speed.

In this second embodiment, it is possible to vary the degree of shift of the center of gravity by varying the configuration of the parallel links 32,33. For example, as the length of the parallel links 32,33 is lengthened, a greater offset can be easily obtained. Alternatively, the offset angle of the parallel links may be increased to increase the shifting of the gravity center. In this embodiment, as the moveable frame body portion 22 includes the fairing 28, a larger effect is created by the center of gravity movement as the weight of the fairing is also shifted to the inside of the corner.

A third preferred embodiment is illustrated in FIG. 11 where the seat 41 may be slidably mounted on the frame body 40 to facilitate shifting of the seat 41 to both side directions with respect to the motorcycle frame. The seat 41 is provided with a slide shaft 44 fixed to a seat bottom or moveable frame portion 43 which is slidably guided by a guide pipe 42 fixed to the frame body 40 and supported by a pair of supporting elements 45 such as rubber or metal bushings. When the operator applies a force to the seat in a left or right side direction with respect to the direction of travel of the motorcycle, the seat 41 may be moved in the corresponding direction with respect to the frame body 40 to thereby shift the center of gravity of the operator and seat to the inside of the corner with respect to the remainder of the motorcycle to thereby increase the effective lean or bank angle of the motorcycle and lower the effective center of gravity. According to the teachings of this embodiment, the fuel tank and other portions of the motorcycle may also be slidably mounted with the seat in order to create a greater shift in the center of gravity according to the teachings of this embodiment. Further, according to the teachings of this invention, the slide shaft 44 and guide pipe 42 may be arcuate to simulate a pivotal shift of the seat and other elements attached thereto such as the fuel tank with respect to the frame body 40. With such an arcuate configuration of the side shaft 44 and guide pipe 42, the relative motion of the seat assembly with respect to the motorcycle frame will be similar to that described with respect to FIGS. 1-6.

Another alternative embodiment of the present invention is described with respect to FIGS. 12 and 13 of the present application. FIG. 12 illustrates the side view of a motorcycle constructed according to the teachings of the present invention. FIG. 13 is a sectional detail of the pivot. The motorcycle is provided with a main frame 1a to which the front and rear wheels 24,26 are mounted on front and rear suspension systems 51,52. A fuel tank 11 is mounted on the main frame 1a and a stay portion 1b of the frame is projected from the main frame 1a in the space formed at the rearward lower portion thereof. The moveable frame body portion 10 is swingingly mounted to the stay 1b to pivot in both side directions via a hinge 1c.

The moveable frame body portion comprises a seat frame 10a one end of which is mounted to hinge 1c for pivoting therearound. A rear cowling 10b is mounted on the seat frame 10a and a seat 12 is provided at the front portion of the cowling 10b. With the above construction, the operator may pivot the moveable frame body portion 10 with respect to the fixed frame 1a by application of force to the steps or foot pegs 7,7 to pivot the moveable frame body portion about an axis A1 of hinge 1c as illustrated in FIG. 13.

As the moveable frame portion 10 can be constructed comparatively compact and light, the rider may swing it easily. The joint between the rear cowling 10b of the moveable frame body portion 10 and the remainder of the motorcycle body work may be covered by an elastic element 1d such as a bellows made of rubber. In FIG. 12, this elastic element is formed between the fuel tank 11 and the front portion of the moveable frame body portion 10 to hide the gap between the fuel tank and the moveable frame body portion 10 generated by the pivotal movement thereof. While the moveable frame body portion 10 of this embodiment is comparatively compact and light and thus does not provide a substantial shift in the overall center of gravity of the motorcycle in and of itself, the rider's weight seated on the seat 12 substantially increases the shift in the center of gravity and thus renders this embodiment even more effective in offsetting the overall center of gravity and increasing the cornering speed at a particular lean angle.

The above described preferred embodiments describe several forms which may be taken by the present invention. It should be understood, however, that the present invention may be employed in a variety of embodiments, with the embodiments described above being exemplary preferred embodiments only. Consequently, substantial variations and alterations to the preferred embodiments of the present invention may be performed within the teachings of the present invention and the present invention may, in fact, apply to center of gravity shifting systems substantially different from those disclosed above. Accordingly, while the preferred embodiments are described with reference to the above presented specification and the accompanying drawings, the scope of the present invention is defined solely by the appended claims.

What is claimed:

1. A motorcycle comprising:
 a fixed frame portion;
 a front wheel, suspended from said fixed frame portion;
 a rear wheel suspended from said fixed frame portion;
 said motorcycle negotiating a corner with said fixed frame portion, said front wheel and said rear wheel inclined at a lean angle $O_b$ with respect to vertical with the center of gravity of thereof located along a center of gravity axis defined by said lean angle;
 a moveable frame portion including a seat; and
 means for moveably mounting said moveable frame portion to said fixed frame portion to allow the said moveable frame portion to be shifted further inside the corner to shift the center of gravity of said moveable frame portion to the inside of the corner to thereby shift the center of gravity of the entire motorcycle inside the corner and increase the effective lean angle of the entire motorcycle.

2. The motorcycle of claim 1 wherein said fixed frame portion houses a power unit for driving the motorcycle.

3. The motorcycle of claim 1 wherein said motorcycle has a lean angle limited by the cornering clearance of the fixed frame portion, the power unit housed within the fixed frame portion and foot pegs mounted on said frame.

4. The motorcycle of claim 1 wherein said front and rear wheels include tires having a cross-sectional profile and wherein said motorcycle has a lean angle limited by the profile of said tires.

5. The motorcycle of claim 1 wherein said moveable frame portion includes a fuel tank.

6. The motorcycle of claim 1 wherein said means for moveably mounting comprises a pivot for mounting said moveable frame portion to said fixed frame portion; said moveable frame portion pivoting with respect to said fixed frame portion further inside the corner.

7. The motorcycle of claim 6 wherein said pivot has a swing center axis A included at an angle $O_A$ with respect to a land surface supporting said motorcycle, said angle $O_A$ being selected to adjust the lowering of the center of gravity of said moveable frame portion with respect to the amount of shift toward the inside of the corner.

8. The motorcycle of claim 6 further comprising:
return means, operatively connected between said fixed and moveable frame portions, for returning said moveable frame portion toward a center position where said moveable frame portion is aligned with said fixed frame portion.

9. The motorcycle of claim 8 wherein said return means includes at least one return spring.

10. The motorcycle of claim 1 wherein said means for moveably mounting comprises parallel linkage means connected between said moveable frame portion and said fixed frame portion for shifting said moveable frame portion with respect to said fixed frame portion.

11. The motorcycle of claim 10 wherein said parallel linkage means comprises first and second pairs of parallel linkages, each said pair having first and second links arranged adjacent a longitudinal center line of said motorcycle.

12. The motorcycle of claim 11 wherein said moveable frame portion supports a motorcycle fairing and handle bar.

13. The motorcycle of claim 1 wherein said means for moveably mounting comprises slide means for sliding said moveable frame portion with respect to said fixed frame portion.

14. The motorcycle of claim 13 wherein said slide means includes a slide shaft fixed to said moveable frame portion and a guide pipe guiding and constraining the movement of said slide shaft.

15. The motorcycle of claim 1 wherein said means for moveably mounting comprises a pivot mounting said moveable frame portion to said fixed frame portion, said pivot being located near the rear portion of said fixed frame portion, adjacent the front portion of said seat.

16. The motorcycle of claim 1 further comprising handlebars mounted to said fixed frame portion.

17. A motorcycle comprising:
a fixed frame portion;
a front wheel suspended from said fixed frame portion;
a rear wheel suspended from said fixed frame portion;
said motorcycle negotiating a corner with said fixed frame portion inclined at a lean angle $O_b$ with respect to vertical; and
a moveable frame portion including a seat for supporting a rider; and
means for moveably mounting said moveable frame portion to said fixed frame portion to allow a rider to shift said moveable frame portion further inside the corner to thereby shift the effective center of gravity of the motorcycle inside the corner without an increase in the lean angle of the entire motorcycle.

* * * * *